United States Patent

Ito et al.

[11] 3,979,572
[45] Sept. 7, 1976

[54] INDUCTION HEATING APPARATUS

[75] Inventors: Toshio Ito; Masahiro Hibino; Tetsuya Kohya, all of Amagasaki, Japan

[73] Assignee: Mitsubishi Denki Kabushiki Kaisha, Tokyo, Japan

[22] Filed: Oct. 29, 1974

[21] Appl. No.: 518,731

[52] U.S. Cl............................ 219/10.49; 219/10.67
[51] Int. Cl.²......................................... H05B 5/04
[58] Field of Search........... 219/10.49, 10.75, 10.79, 219/10.67; 220/9 F, 63; 126/390

[56] References Cited
UNITED STATES PATENTS
3,745,290  7/1973  Haanden et al.................. 219/10.49
FOREIGN PATENTS OR APPLICATIONS
1,157,711  7/1969  United Kingdom.............. 219/10.49

Primary Examiner—Bruce A. Reynolds
Attorney, Agent, or Firm—Oblon, Fisher, Spivak, McClelland & Maier

[57] ABSTRACT

An induction heating apparatus which comprises a ferromagnetic member; a non-magnetic highly conductive member connected to the ferromagnetic member on one side thereof; a non-magnetic high electrical resistance member forming a vacuum space between itself and the side of the non-magnetic highly conductive member not connected to the ferromagnetic member; an exciter which is excited by a low frequency power source to generate an alternating magnetic field and to form a magnetic circuit passing through the non-magnetic high resistance member, the non-magnetic highly conductive member and the ferromagnetic member; whereby the non-magnetic highly conductive member is heated by induction heating and is insulated by the vacuum space.

18 Claims, 19 Drawing Figures

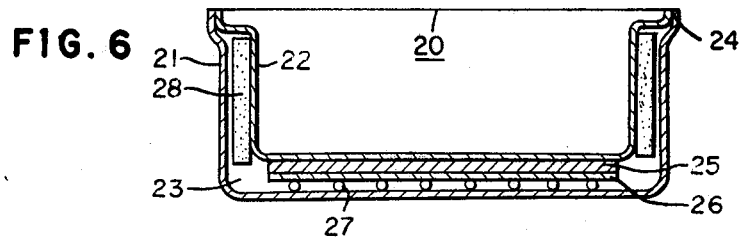
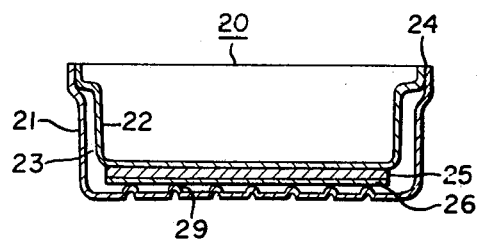
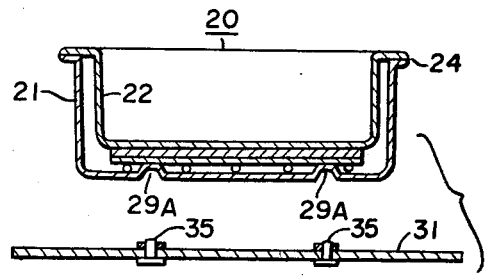
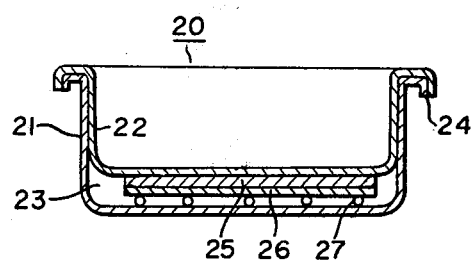

INDUCTION HEATING APPARATUS

BACKGROUND OF THE INVENTION

1. Field of the Invention

The present invention relates to an induction heating apparatus which is excited by a commercial frequency power source, especially induction heating cooking apparatus excited by a commercial frequency power source.

2. Description of the Prior Art

Heretofore, induction heating cooking apparatus excited by high frequency such as about 10 – 30 K Hz has been known. However, since it requires a high frequency power source, it is quite expensive.

An induction heating cooking apparatus excited by a low frequency commercial power source such as 50 – 60 Hz has been proposed by the inventors. However, this apparatus had low heating efficiency and/or generated noise. The inventors have developed an induction heating cooking apparatus excited by a commercial frequency power source using two important inventions. The patent applications covering these inventions will be designated below.

The first invention is to provide a double layer structure connecting a non-magnetic highly conductive plate to the lower surface of the ferromagnetic plate at the bottom of the cooking pot. FIG. 1 shows one embodiment of the cooking pot wherein the reference numeral 1 designates a ferromagnetic member such as iron; 2 designates a non-magnetic highly conductive member such as aluminum or copper; and 3 designates a cover.

The second invention is to provide two groups of excitation circuits for generating magnetic flux across a cooking pot which gives a 90° phase difference whereby the alternating components of electromagnetic force applied to the cooking pot are cancelled in order to prevent the generation of noise. A practical induction heating cooking apparatus operated by a commercial frequency power source has been made possible by these two inventions.

In the cooking pot previously invented, the electrical heating efficiency (ratio of heat generated in the cooking pot to the electrical input) was about 91 percent. However the total heating efficiency (ratio of the heat of the heated material in the pot to the electrical input) was about 70 percent. Thus, heat corresponding to about 20 percent of the electrical input escaped from the cooking pot to the environment as heat loss. The heat loss is caused by the heat transmission from the bottom of the cooking pot to the cover plate of the range table and by the radiation from the side walls and cover of the cooking pot to air. The heat transmitted from the cooking pot to the range cover plate results in a rise in temperature of the cover plate.

SUMMARY OF THE INVENTION

It is an object of the present invention to provide an induction heating apparatus excited by a commercial frequency power source which gives a total heating efficiency higher than that of the previous invention.

Another object of the invention is to provide a cooking pot used for induction heating cooking apparatus having high total heating efficiency.

The foregoing and other objects are attained in accordance with one aspect of the present invention through the provision of a cooking pot which comprises a two layer structure comprising a ferromagnetic plate joined to a non-magnetic highly conductive plate at the lower side of the ferromagnetic plate and an outer plate of non-magnetic high electrical resistance material which covers the outside of the pot to form a thin space of vacuum or low pressure between the two layer structure and the non-magnetic high electrical resistance plate whereby the heat loss from the cooking pot can be minimized, the temperature of the outer wall of the cooking pot is not increased as high during cooking and the rise in temperature of the range cover plate on which the cooking pot is placed can be decreased.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 2A is a partially broken schematic view of a cover;

FIG. 2B is a partially broken schematic view of a cooking pot;

FIG. 2C is a partially broken schematic view of a range;

FIG. 2D is a partially broken schematic view of excitation windings;

FIG. 2E is a schematic view of iron core;

FIGS. 6–15 are, respectively, sectional views of the embodiments of the cooking pot used in the present invention.

DETAILED DESCRIPTION OF THE PREFERRED EMBODIMENTS

Figure 1:
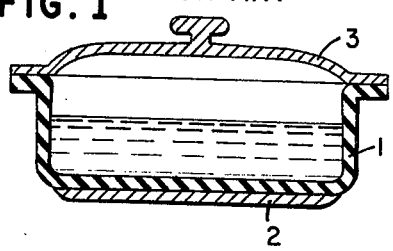
FIG. 1 is a sectional view of a cooking pot used for the induction heating apparatus of the former invention.

Referring to the drawings, the embodiments of the cooking apparatus of the invention will now be described.

Figure 2A:
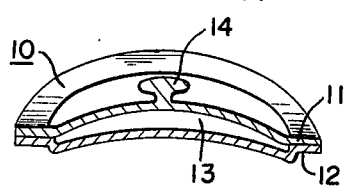
FIGS. 2A–2E are respectively schematic views of parts of one embodiment of the induction heating apparatus according to the present invention.
Figure 2B:
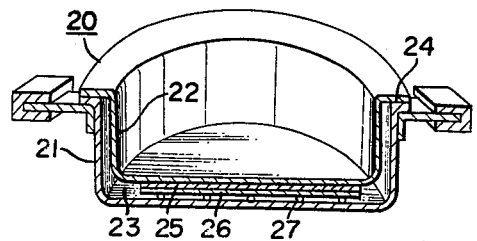
Figure 2C:
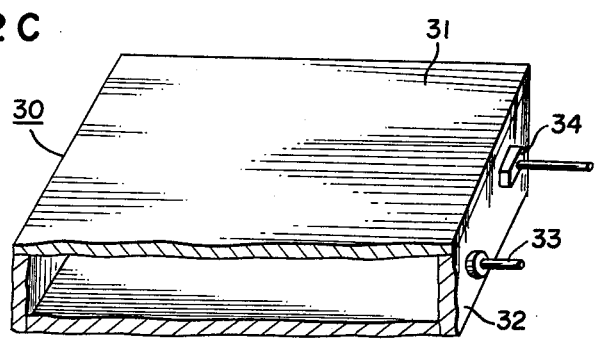
Figure 2D:
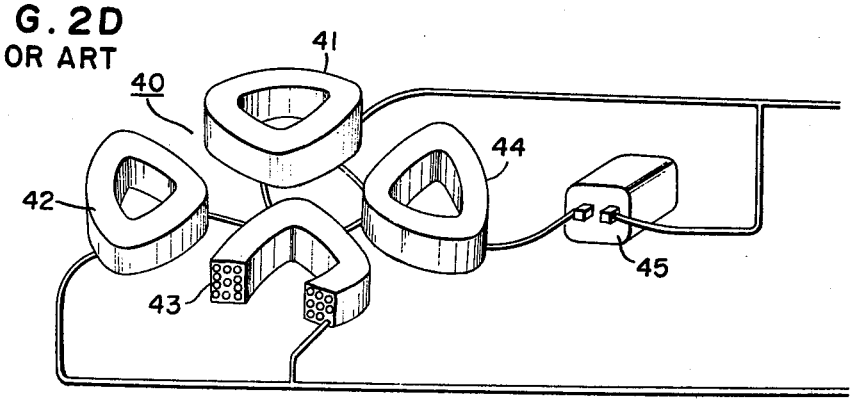
Figure 2E:
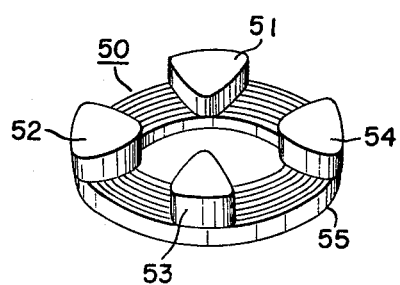

FIGS. 2A–2E are schematic views of parts of one embodiment of the cooking apparatus of the invention. FIG. 2A shows a cooking pot cover; FIG. 2B shows a cooking pot; FIG. 2C shows a range; FIG. 2D shows excitation windings; and FIG. 2E shows iron cores.

in FIG. 2A, a cover 10 comprises an outer plate 11, an inner plate 12 and a space 13. The space 13 is maintained as a vacuum for heat insulation. A knob 14 is mounted on the outer plate 11. The material for the outer and inner plates 11, 12, can be any material and is preferrably stainless steel. In the space 13 may be sealed a low pressure inert gas or a low density heat insulating material such as glass fiber.

In FIG. 2B, the cooking pot 20 comprises an outer plate 21 and an inner plate 22 which are connected to form a space 23 and are sealed to form a sealing part 24. The space 23 is maintained as a vacuum. An inert gas having low heat conductivity such as argon gas can be sealed under low pressure in space 23. Although heat insulation is slightly decreased by the inert gas, the vacuum pressure applied to the outer cover 21 can be decreased. The inert gas does not corrode the material of the cooking pot. The material of the outer plate 21 must be non-magnetic and have a high electrical resistance. This material is preferably stainless steel but can also be ceramic.

The stainless steel plate is preferable becuase the metal has low heat conductivity which is not inductively heated. The outer plate 21 is preferably thin from the viewpoint of the electrical heat efficiency although mechanical strength must be taken into consideration. When stainless steel is used for a cooking pot having a diameter of 15 - 25 cm, the thickness of the outer plate is preferably about 0.3 - 0.5 mm. The inner plate 22 can have any electrical property and is preferably stainless steel. The thickness of the inner plate is preferably about 0.4 - 0.7 mm. The sealing part 24 can be formed by welding. A ferromagnetic plate 25 is connected to the bottom lower surface of the inner plate 21 and a non-magnetic highly conductive plate 26 is connected to the lower surface of the ferromagnetic plate 25. A heat insulating material 27 is inserted between the highly conductive plate 26 and the outer plate 21. The ferromagnetic plate 25 can be iron plate. The thickness of the iron plate is preferably more than 2.6 mm where the excitation is by commercial frequency. The non-magnetic highly conductive plate 26 is preferably aluminum plate or copper plate. The optimum thickness of the non-magnetic highly conductive plate 26 and the ferromagnetic plate 25 are illustrated in detail in the following copending applications.

Japanese Patent Application No. 44117/1972
U.S. Patent application Ser. No. 356,386; now abandoned,
Continuation application Ser. No. 523,113, now U.S. Pat. No. 3,928,744;
British Patent Application No. 20217/1973;
West German Patent Application No. P2322/29.6;
French Patent Application No. 73.15719;
Italian Patent Application No. 23476A/1973; now Italian Patent No. 984,158;
Canadian Patent Application No. 170,131.

The optimum thickness of the non-magnetic highly conductive plate 26 is selected so as to increase the heat efficiency for the cooking pot 20 and to decrease the noise generated by the cooking pot 20 and is slightly dependent upon the outer diameter of the cooking pot, exciting frequency, etc. Thus, in a typical case of excitation by commercial frequency where the outer diameter of the cooking pot is 15 - 25 cm, the thickness of the aluminum plate is preferably 0.3 - 2.7 mm and most preferably about 1.2 mm, and the thickness of copper plate is preferrably 0.2 - 1.7 mm and most preferably about 0.7 mm.

The vacuum space 23 is formed for heat insulation between the non-magnetic highly conductive plate 26 and the outer plate 21 of the cooking pot. The thickness of the space is about 0.5 - 1.0 mm at the bottom of the cooking pot and is about 1 - 10 mm at the sidewall of the cooking pot. The vacuum space 23 decreases heat conductivity from the inside of the cooking pot to the outer plate 21. The heat conductivity caused by radiation can be decreased by having the surface of the highly conductive plate 26 and the inner surface of the outer and inner plates 21, 22 be mirror-like surfaces. For example, heat radiation to the outside can be decreased by providing thin metallic plating such as chromium plating on the lower surface of the highly conductive plate 26. The heat insulating material 27 is inserted for insulating the outer plate 21 of the cooking pot from the highly conductive plate 26. A vacuum in space 23 also contributes to such insulation.

The heat insulating material 27 receives the electromagnetic force applied to the ferromagnetic plate 25 and the highly conductive plate 26 in the downward direction. It is preferable to use a heat insulating material 28 which does not conduct the heat generated by the high conductive plate 26. The heat insulating material 27 is preferably in the form of porous pellets made of ceramic glass or asbestos. The shape of the pellets can be spherical, semi-spherical or cylindrical, etc. The heat transmitted from the inside of the cooking pot 20 through the material 27 to the outer plate 21 of the cooking pot can be minimized by using such heat insulating material. It should be noted that the heat insulating material 27 is not limited to the above-mentioned and various modifications can be considered.

The preparation of the cooking pot 20 will now be described. About 50 pieces of ceramic small balls 27 are disposed on the bottom of the stainless steel outer plate 21 and are adhered with a small amount of binder. Then, the stainless steel inner plate 22 connecting the iron plate 25 and the copper plate 26 is fitted to the outer plate 21, the sealing part 24 is welded and the space 23 is evacuated to form a vacuum.

As is clear the description, the thickness of the bottom of the cooking pot is 5 - 6 mm total and the thickness of the side wall of the cooking pot is several - 10 mm total. The total thickness of the cooking pot should be acceptable in practical use. (In the drawings, this is schematically shown for the convenience of understanding.) The cooking pot 20 of the invention has the above-mentioned structure and the heat insulating effect is remarkably high because of the vacuum space 23 between the outer plate 21 and the inner plate 22. The heat loss from the inside of the cooking pot to the outside can be decreased to about 1/5. Theoretically, it can be decreased to about 1/10. Accordingly, the temperature of the outer plate 21 of the cooking pot can be kept quite low during cooking so that the danger of scalding is eliminated. Since the temperature of the outer plate 21 of the bottom of the cooking pot is low, the heat transmission from the cooking pot 20 to the range cover 31 of FIG. 2C is small and, accordingly, the rise of temperature of the range cover can be low. According to tests, the temperature of the side wall of the cooking pot 20 can be lower than 50°C and the temperature of the bottom can be lower than 100°C during cooking.

In FIG. 2C, a range table 30 conprises a cover plate 31 and a box 32. The excitation apparatus comprising the exciting windings of FIG. 2D and the cores of FIG. 2E are held in the range table 30. The box 32 is equipped with a switch 33 and a power source plug 34. The cooking pot 20 of FIG. 2B is placed on the cover plate 31 which must be non-magnetic and of high electrical resistance and which is preferably made of stainless steel, ceramic, laminated resin plate, etc. and has a thickness of about 1 mm. When a conventional cooking pot is used, the heat transmission from the cooking pot is so high that the rise of the temperature of the cover plate 31 is high and thermal deformation of the cover plate 31 must be considered. However, when the cooking pot 20 of the present invention is used, the rise of temperature of the cover plate 31 can be decreased to about 2/3 and the temperature of the cover plate 31 can be lower than about 100°C. Accordingly, the material of the cover plate 31 can be selected from various materials and the cost can be decreased. Thus, the cover plate 31 can be thin, and, accordingly, the distance between the surface of the magnetic poles of the core 50 held under the cover plate 31 and the lower surface of the non-magnetic highly conductive plate 26 of the cooking pot 20 placed on the cover plate 31 can be minimized to about 2 – 2.5 mm.

In FIG. 2D, excitation circuit 40 comprises excitation windings 41–44 and a phase shift capacitor 45. In FIG. 2E, the core 50 is composed of four ferrite magnetic poles 51–54 which are mounted to a yoke 55 formed by winding silicon steel plates. The excitation windings 41–44 of FIG. 2D are respectively fitted on the magnetic poles 51–55 of FIG. 2E.

Figure 3:
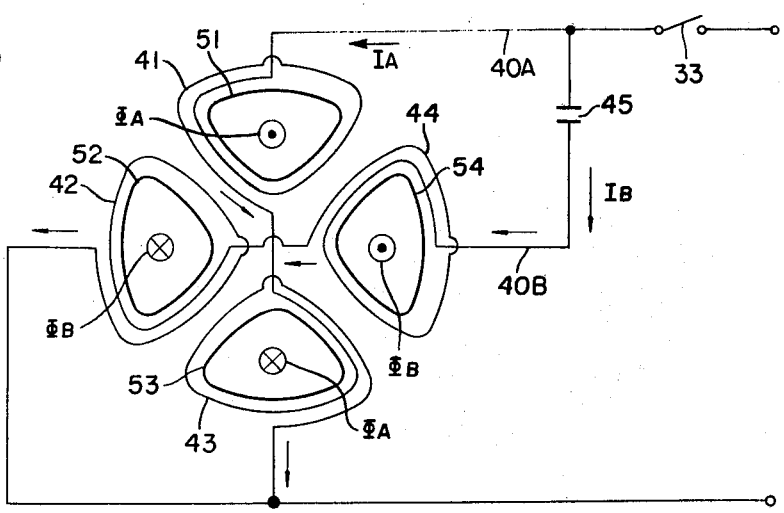
FIG. 3 shows a connection of excitation windings.

FIG. 3 shows one embodiment of the connection of the excitation windings. The excitation windings 41 and 43 which are disposed in symmetrical position are connected in series to form one excitation circuit 40A. The excitation windings 42 and 44 are connected in series with the phase shift capacitor 45 to form the other excitation circuit 40B. Commercial frequency power of 50 or 60 Hz is applied to the excitation circuit. The currents $I_A$ and $I_B$ of the excitation circuits are generated with a 90° phase difference. At a given moment, the magnetic flux $\Phi_A$ and $\Phi_B$ passes through the magnetic poles 41–44 as shown in FIG. 3.

Figure 4:
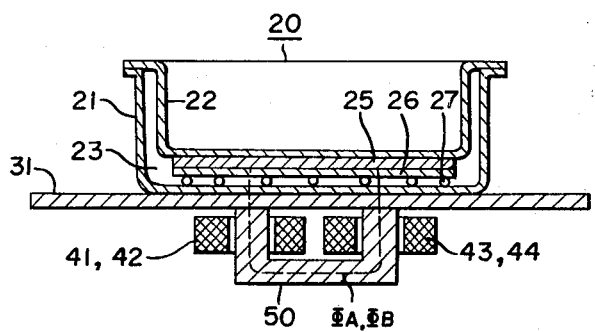
FIG. 4 is a sectional schematic view of the embodiment of FIGS. 2A–2E.
Figure 5:
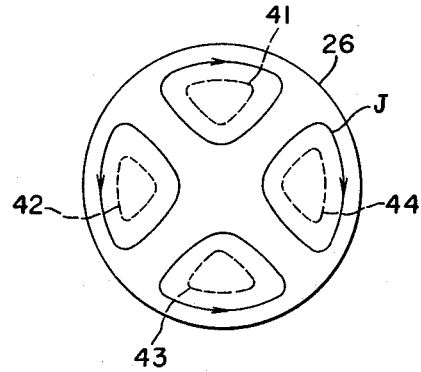
FIG. 5 shows the eddy current on the non-magnetic highly conductive plate of the cooking pot of FIG. 2B.

FIG. 4 shows a magnetic circuit in the core 50 and the cooking pot 20. The magnetic flux $\Phi_A$ or $\Phi_B$ is passed from the magnetic poles through the cover plate 31, the outer cover 21 of the cooking pot and the highly conductive plate 26 to the ferromagnetic plate 25. By virtue of the alternating magnetic field, an eddy current J is induced in the non-magnetic high conductive plate 26 as shown in FIG. 5 causing Joule heat to be generated. The heat generated in the highly conductive plate 26 is transmitted to the inner plate 22 of the cooking pot to heat the material in the cooking pot. By virtue of the magnetic flux $\Phi_A$, the electro-magnetic force applied to the cooking pot changes to a vibrating electromagnetic force formed by an overlapping constant DC electro-magnetic force and an alternating electro-magnetic force whereby excessive noise is generated. However, in accordance with the invention, the magnetic flux $\Phi_A$ has a 90° phase difference with respect to the magnetic flux $\Phi_B$, and, accordingly, the alternating components of the magnetic forces of the magnetic flux $\Phi_A$, $\Phi_B$ cancel each other whereby only a constant attractive electro-magnetic force (which is not fluctuated) is applied to the cooking pot 20. Accordingly, no noise is generated by the cooking pot 20. The cooking pot 20 of the invention, the ferromagnetic plate 25 and the non-magnetic highly conductive plate 26 are preferably designed so that the absolute value of the electro-magnetic force applied to the cooking pot 20 is quite small so that the noise can be decreased considerably.

The invention of cancellation of the alternating components of the electro-magnetic forces through the use of two excitation circuits with a 90° phase difference is disclosed in the following copending applications.

Japanese Patent Application No. 82604/1972;
U.S. Patent Application Ser. No. 372,610; now U.S. Pat No. 3,906,181
British Patent Application No. 29847/1973;
West German Patent Application No. 2332049.2;
French Patent Application No. 7,323,000;
Italian Patent Application No. 26394A/1973; now Italian Patent No. 991,094
Canadian Patent Application No. 179027;
Swedish Patent Application No. 7401385-5;
Denmark Patent Application No. 561/1974;
Swiss Patent Application No. 2110.1974;
Austrian Patent Application No. 1198;
Australian Patent Application No. 65454/1974.

The induction heating apparatus of the invention has the above-mentioned structure and is excited by commercial frequency power to yield remarkably high heating efficiency without the generation of noise. The cooking pot has especially effective heat insulation and, accordingly, it is effective to improve the total heating coefficient and to decrease the rise of temperature of the cover plate of the cooking pot and the cover plate of the range table. The cover plate may even be touched by hand during cooking without danger. A cooking efficiency equal to that of a conventional gas range can be achieved by applying 1 – 1.5 KW of electrical input to the cooking apparatus of the invention.

FIG. 6 shows another embodiment of the invention. As shown in FIG. 6, the cooking pot includes heat insulation member 27 as well as elongated heat insulation member 28.

FIG. 7 shows another embodiment of the invention. The cooking pot 20 has projections 29 on the inner surface of the outer plate 21 of the cooking pot with a suitable gap so as to contact the top of the highly conductive plate 26. As the contacts are point contacts, the heat transmission from the highly conductive plate 26 to the outer plate 21 is small. The projections 29 give an effect similar to that of the heat insulation pellets 27 of FIG. 2B so as to prevent the deformation of the outer plate 21 by atmospheric pressure.

FIG. 8 shows another embodiment of the invention. The cooking pot 20 has concave parts 29A (for example three parts) on the bottom of the outer plate 21 in the cooking pot of FIG. 2B. The concave parts are fitted to the projections 35 of the cover plate 31 of the range table 30 whereby the movement of the cooking pot 20 during cooking can be prevented.

FIG. 9 shows another embodiment of the invention. The cooking pot 20 has a vacuum space 23 only at the bottom of the cooking pot. By this structure, it is possible to prevent the transmission of heat from the outer plate 21 to the range table.

Figure 10:
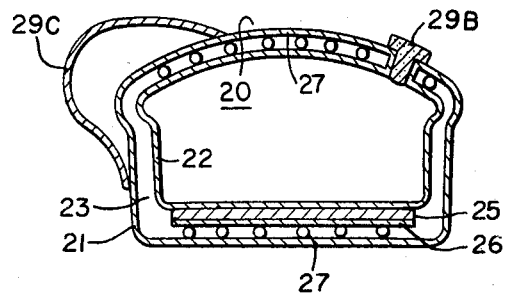

FIG. 10 shows another embodiment of the invention. The reference numeral 29B designates a tap made of a high heat insulating material and 29C designates a handle. The structure of the kettle type cooking pot gives high heat insulation in a manner similar to that of a vacuum (thermos) bottle.

Figure 11:
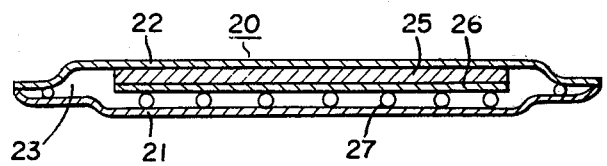

FIG. 11 shows another embodiment of the invention wherein the hot plate type cooking pot is used for cooking meat. The hot plate type cooking pot imparts substantially no heat transmission to the lower surface of the hot plate 20. When a different commercial pot having a flat bottom surface is placed on the hot plate type cooking pot 20, the heat generated by the hot plate 20 is substantially transmitted to the pot so as to heat the pot. In this case, the pot placed on the hot plate 20 can be made of aluminum, iron, ceramic, etc. The total heat coefficient of the cooking pot is superior to that of the conventional electrical resistance type heating apparatus. In FIGS. 10 and 11, certain modifications of the invention have been illustrated. In accordance with the invention, other modifications of the structure can be utilized in order to give the effect of the invention.

Figure 12:
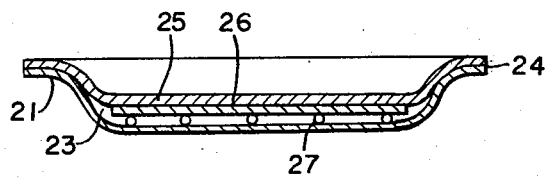

FIG. 12 shows another embodiment of the invention. In the cooking pot 20 shown in FIG. 12, the ferromagnetic plate 25 forms the inner plate of the cooking pot. The structure is suitable where the iron plate 25 can be exposed at the inner plate of the cooking pot. The surface of the iron plate 25 can be coated with a coating membrane for protection or appearance such as tetrafluoroethylene coating.

Figure 13:
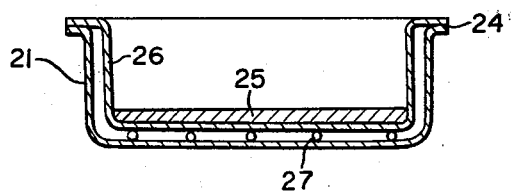

FIG. 13 shows another embodiment of the invention. In the cooking pot 20 shown in FIG. 13, conductive plate 26 forms the inner plate which forms the vacuum space 23 with the stainless steel outer plate 21. The ferromagnetic plate 25 is connected to the inner bottom of the cooking pot.

Figure 14:
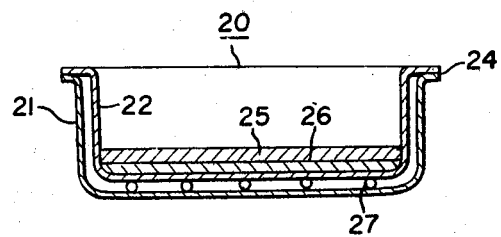

FIG. 14 shows another embodiment of the invention. The cooking pot 20 is prepared by joining the outer plate 21 made of stainless steel and the inner plate 22 together to form a pot with a vacuum hollow part 23. Then, the high conductive plate 26 and the ferromagnetic plate 25 are joined.

Figure 15:
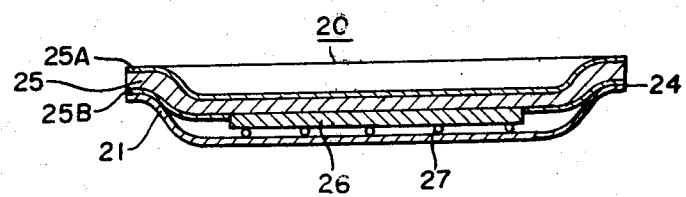

FIG. 15 shows another embodiment of the cooking pot of the invention. In the cooking pot 20 shown in FIG. 15, thin stainless steel plates 25A, 25B are connected to the main surface and back surface of the iron plate 25. In this structure, the stainless steel plate 25B has substantially no electrical effect.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Induction heating apparatus comprising:
   an inner member for holding material to be heated,
   an outer member of non-magnetic high electrically resistive material joined to the inner member,
   a planar magnetic member joined to the inner member,
   a planar non-magnetic high electrically conductive member joined to the magnetic planar member to be disposed between the magnetic planar member and the outer member,
   a thermally insulative space between the outer member and the inner member and between the outer member and the planar non-magnetic high electrically conductive member,
   an exciter excited by a 60 cps power source to generate an alternating magnetic field and to form a magnetic circuit through the outer member, the planar magnetic member and the planar non-magnetic high electrically conductive member,
   the outer member being of stainless steel with a diameter of 15–25 cm. and a thickness of 0.3–0.5 mm.,
   the inner member being of stainless steel with a thickness of 0.4–0.7 mm.,
   the planar magnetic member being an iron plate with a thickness greater than 2.6 mm.,
   the planar non-magnetic high electrically conductive member being aluminum with a thickness of 0.3–2.7 mm.

2. Induction heating apparatus in accordance with claim 1 wherein the outer member has a plurality of projections which contact the planar non-magnetic high electrically conductive material.

3. Induction heating apparatus in accordance with claim 1 wherein the thermally insulative space contains an inert gas having low heat conductivity.

4. Induction heating apparatus in accordance with claim 1 wherein the thickness of the thermally insulative space between the outer member and the planar non-magnetic high electrically conductive member is 0.5–1.0 mm.

5. Induction heating apparatus in accordance with claim 1 wherein the thermally insulative space is a vacuum.

6. Induction heating apparatus in accordance with claim 1 wherein the thermally insulative space has heat insulating material disposed therein within a vacuum.

7. Induction heating apparatus in accordance with claim 6 wherein the heat insulative material comprises small segments of heat resistant inorganic insulating material.

8. Induction heating apparatus in accordance with claim 7 wherein the small segments are pellets of ceramic.

9. Induction heating apparatus in accordance with claim 7 wherein the small segments are pellets of glass.

10. Induction heating apparatus comprising:
    an inner member for holding material to be heated,
    an outer member of non-magnetic high electrically resistive material joined to the inner member,
    a planar magnetic member joined to the inner member,
    a planar non-magnetic high electrically conductive member joined to the magnetic planar member to be disposed between the magnetic planar member and the outer member,
    a thermally insulative space between the outer member and the inner member and between the outer member and the planar non-magnetic high electrically conductive member,
    an exciter excited by a 60 cps power source to generate an alternating magnetic field and to form a magnetic circuit through the outer member, the planar magnetic member and the planar non-magnetic high electrically conductive member,
    the outer member being of stainless steel with a diameter of 15–25 cm. and a thickness of 0.3–0.5 mm.,
    the inner member being of stainless steel with a thickness of 0.4–0.7 mm.,
    the planar magnetic member being an iron plate with a thickness greater than 2.6 mm.,
    the planar non-magnetic high electrically conductive material being copper with a thickness of 0.2–1.7 mm.

11. Induction heating apparatus in accordance with claim 10 wherein the outer member has a plurality of projections which contact the planar non-magnetic high electrically conductive material.

12. Induction heating apparatus in accordance with claim 10 wherein the thermally insulative space contains an inert gas having low heat conductivity.

13. Induction heating apparatus in accordance with claim 10 wherein the thickness of the thermally insulative space between the outer member and the planar non-magnetic high electrically conductive member is 0.5–1.0 mm.

14. Induction heating apparatus in accordance with claim 10 wherein the thermally insulative space is a vacuum.

15. Induction heating apparatus in accordance with claim 10 wherein the thermally insulative space has heat insulating material disposed therein within a vacuum.

16. Induction heating apparatus in accordance with claim 15 wherein the heat insulative material comprises small segments of heat resistant inorganic insulating material.

17. Induction heating apparatus in accordance with claim 16 wherein the small segments are pellets of ceramic.

18. Induction heating apparatus in accordance with claim 16 wherein the small segments are pellets of glass.

* * * * *